United States Patent [19]

Hanff

[11] 4,015,616
[45] Apr. 5, 1977

[54] AUTOMATIC WATERING DEVICE
[76] Inventor: Ludovic F. Hanff, 6243 Evergreen Ave., North, Seminole, Fla. 33542
[22] Filed: Aug. 25, 1975
[21] Appl. No.: 607,115
[52] U.S. Cl. .................... 137/78; 137/624.12; 251/30; 239/63; 200/61.04
[51] Int. Cl.² ......................................... A01G 25/00
[58] Field of Search .......... 137/78, 624.12, 624.18; 251/30; 239/63, 64; 200/61.04, 61.06

[56] References Cited

UNITED STATES PATENTS

| | | | |
|---|---|---|---|
| 2,688,056 | 8/1954 | Kettering | 200/61.06 |
| 2,796,291 | 6/1957 | Mueller | 239/64 |
| 3,039,698 | 6/1962 | Richards | 239/64 |
| 3,253,615 | 5/1966 | Armstrong | 251/30 X |
| 3,439,895 | 4/1969 | Marandi | 251/30 |

*Primary Examiner*—Alan Cohan
*Attorney, Agent, or Firm*—William Frederick Werner

[57] ABSTRACT

This invention relates to a device for providing water to a lawn in accordance with the amount of moisture in the soil. As the soil dries, moisture sensitive switches react to the drying process until, at a preselected degree of dryness, the moisture sensitive switches close an electrical circuit to actuate a water pump and thereby provide water to the lawn.

4 Claims, 9 Drawing Figures

4,015,616

AUTOMATIC WATERING DEVICE

STATEMENT OF INVENTION

This invention relates to a moisture sensitive hydro-electrical switch, an electrical circuit and a fluid pressure valve which combine to provide a device for watering farm land to maintain a preselected amount of moisture in the soil.

PRIOR ART

In the prior art, watering devices were operated on a time basis. That is, a water supply was started each day at 8:00 a.m. whether it was raining or not. The water supply could be manually shut off. But the amount of moisture in the soil was not considered a factor by the automatic device which operated the water supply. Consequently, many lawns and farms lands had an overabundance of water in a wet season and a lack of a proper amount of water in a dry season.

OBJECTS OF THE INVENTION

Accordingly, it is a principal object of the present invention to provide a device for providing a preselected amount of moisture to soil in accordance with the degree of moisture in the soil.

Another object of the present invention is to provide a water saving and energy saving device which provides water to soil in accordance with the water needs of that soil.

Other objects of the present invention will become apparent in part and be pointed out in part in the following specification and claims.

Referring to the drawings in which similar reference characters refer to the same parts:

Figure 4:
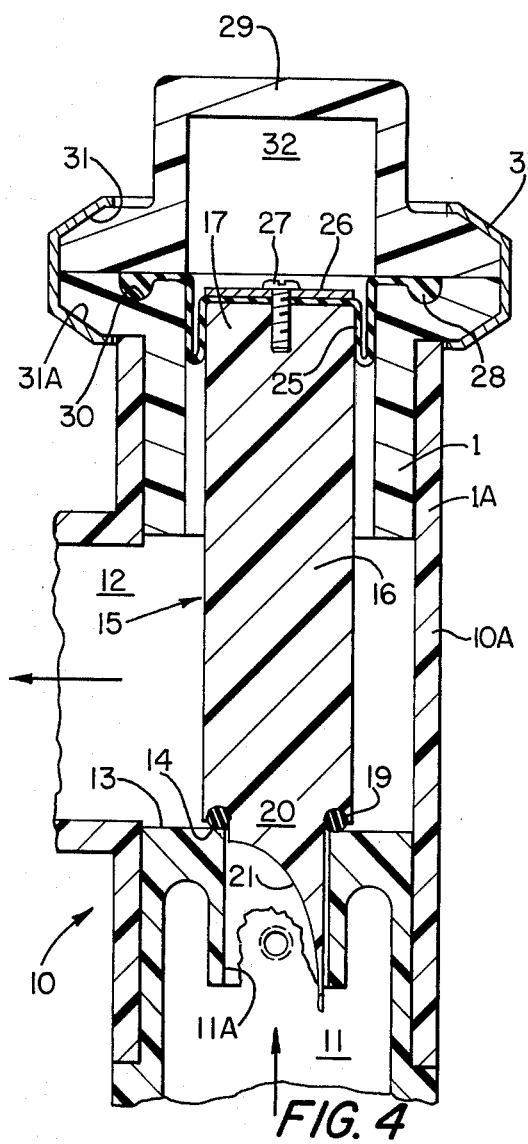
FIG. 4 is a view similar to FIG. 2, taken on a vertical line at right angles to line 2—2.
Figure 3:
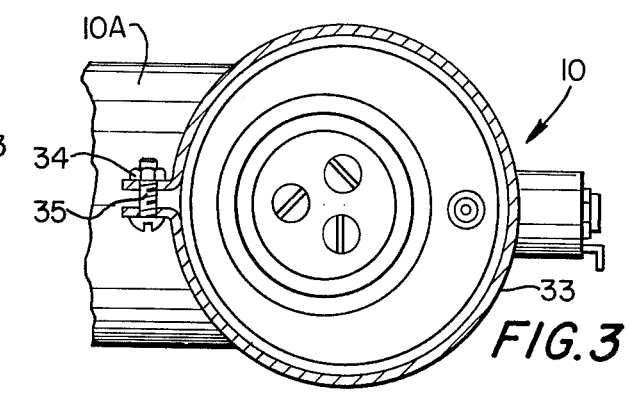
FIG. 3 is a horizontal cross sectional view taken on line 3—3 of FIG. 2.
Figure 2:
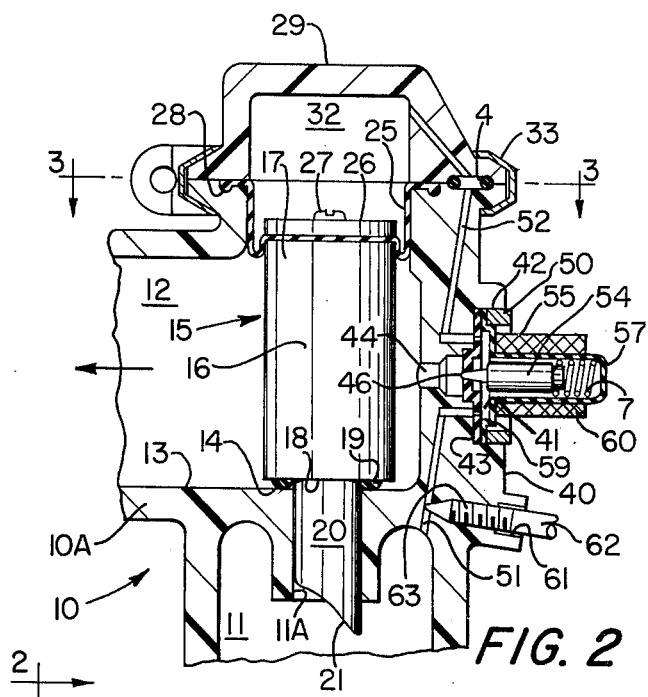
FIG. 2 is a vertical cross sectional view taken on line 2—2 of FIG. 1.
Figure 9:
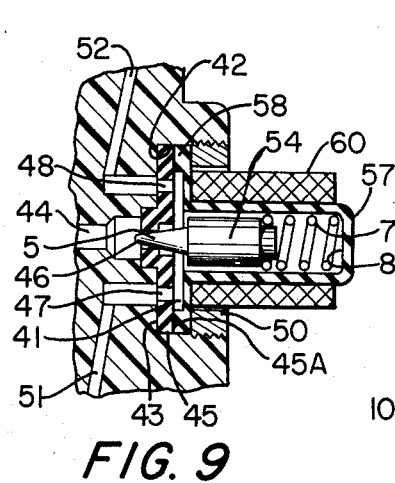
FIG. 9 is an enlarged cross sectional view of the cap, coil, spring, plunger and diaphragm.
Figure 1:
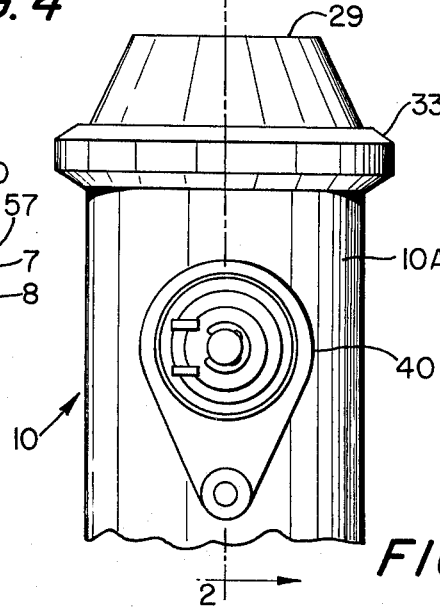
FIG. 1 is a side elevational view of the fluid pressure valve.
Figure 8:
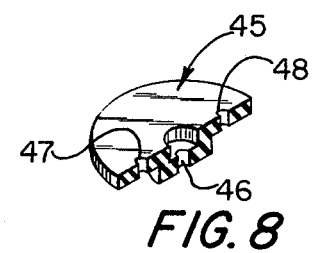
FIG. 8 is a fragmentary cross sectional view of the diaphragm.

In proceeding with this invention reference is made to FIGS. 1, 2, 3 and 4, wherein is illustrated a fluid pressure valve, generally indicated by reference numeral 10, having a hollow valve body 10A. For purposes of manufacture valve body 10A is shown as comprising two elements 1 and 1A fastened together as a unitary valve body. Valve body 10A comprises a vertical inlet passageway 11 having a shelf 13 provided with a valve bore 11A and a horizontal outlet passageway 12. At the intersection of vertical bore 11A and horizontal passageway 12 on shelf 13, there is provided a valve seat 14.

An inlet valve, generally indicated by reference numeral 15, comprises a valve body 16 having a valve head 17, a valve seat 18 provided with an O-ring or fluid sealing ring 19, and a valve stem 20 provided with an arcuate fluid pressure surface 21. Valve head 17 has a preselected area. Arcuate fluid pressure surface 21 has an area less than the area of valve head 17, and by way of example could be one half the preselected area of valve head 17. A fluid sealing membrane 25 is fastened to the top surface of valve head 17, as by means of a washer 26 and machine screw 27 rotatively fastened in head 17. Membrane 25 is provided with a beaded edge 28 located in a groove 30 provided in valve body 10. With this construction, inlet valve 15 is vertically movable in inlet passageway 11, with valve stem 20 slidably mounted in valve bore 11A while membrane 25 fluid seals the end of inlet passageway 11. A tapered flange 31A is provided on one end of valve body 10. A cap 29 provided with a tapered shoulder 31 and a chamber 32 is fastened to tapered flange 31A by means of a cap ring 33 with Chamber 32 aligned with valve head 17. Cap ring 33 is provided with a nut 34 and screw 35 fastening means.

Valve body 10 is provided with a boss 40 having a cavity 41 consisting of a wall 42, a base 43 and a duct 44 connecting the cavity 41 with outlet passageway 12.

A diaphragm 45 provided with a plunger valve port 46, a first port 47, a second port 48, and a circular edge 45A, is located in said cavity with said plunger valve port 46 aligned with said duct 44. A hollow cap 57 has a flanged end 58 which engages circular edge 45A to seat diaphragm 45 against base 43. A retaining ring 50 is fastened in wall 42, as by screw threads, and engages said flanged end 58 to secure said hollow cap 57 and diaphragm 45 in said cavity 41 with a space provided by said flanged end 58 between said hollow cap 57 and said diaphragm 45. Said space being the reduced free area of said cavity 41.

A plunger 54 having a valve end 5 is slidably mounted within said hollow cap 57. A resilient means, such as a coil spring 7, is interposed between the top of the plunger 54 and the inside surface 8 of the top of hollow cap 54. A solenoid 60 surrounds hollow cap 57 and is fastened thereto by means of a tight fit.

Valve body 10 is provided with a first fluid pressure conduit 51 having a preselected diametrical area having a value A. Conduit 51 connects inlet passageway 11 with cavity 41 through first port 47. Valve body 10 is also provided with a second fluid pressure conduit 52 which is also provided in cap 29. Conduit 52 has a preselected diametrical area larger than A, and by way of example, has a value of three times A. Back pressure flows through conduit 52 as will presently appear. Conduit 52 connects chamber 32 with cavity 41 through second port 48.

Boss 40 is provided with a bore 61. A needle valve 62 provided with screw threads 63 is rotatively mounted in bore 61 so that valve 62 may block, unblock or partially block fluid pressure conduit 51 and thereby control the volume of fluid flowing through conduit 51.

In operation, fluid under pressure enters inlet 11. With by-pass valve 62 open, fluid flows through conduit 51, through first port 46 into cavity 41 and through second port 48 into conduit 52 to chamber 32. An O-ring 4 is provided between cap 29 and valve body 10 at the intersection where conduit 52 leaves body 10 and enters cap 29. Fluid pressure in chamber 32 acts upon top 17 of valve body 16 to force O-ring 19 and valve seat 18 against valve seat 14 to prevent fluid from flowing from inlet 11, past O-ring 19 and valve seat 18 into outlet 12.

Solenoid 60 actuated by switch 100 electrically induces armature plunger 54 to lift valve end 5 out of plunger valve port 46 to permit fluid to flow through port 46 into outlet 12.

Because conduit 52 is three times the area of conduit 51, there is a reverse flow of fluid from chamber 32 into cavity 41. This permits the fluid in the inlet 11 acting upon arcuate surface 21 to push plunger 15 upward away from valve seat 14 because the fluid pressure in chamber 32 has become nil due to the reverse flow of fluid. Fluid now flows from inlet 11 to and through outlet 12.

The needle valve 62 can shut off the flow of fluid through conduit 51 and thereby inactivate the function of inlet valve 15. Needle valve 62 also adjusts the fluid volume flow through conduit 51.

Deenergizing coil 60 causes spring 7 to force valve end 5 to seat in plunger valve port 46 to permit fluid to flow from inlet 11 through conduit 51, port 47, cavity 41, port 48, conduit 52 to chamber 32 where the fluid acts upon head 17 to seat O-ring against valve seat 14 to prevent fluid from flowing from inlet 11 to outlet 12. Valve head 17 being greater in area than arcuate fluid pressure surface 21, will overcome the force of the fluid pressure acting upon arcuate fluid pressure 21. Conversely, due to fluid flowing through back pressure conduit 52, the fluid pressure acting upon arcuate fluid pressure surface 21 will now move valve 15 away from valve seat 14.

Figure 5:
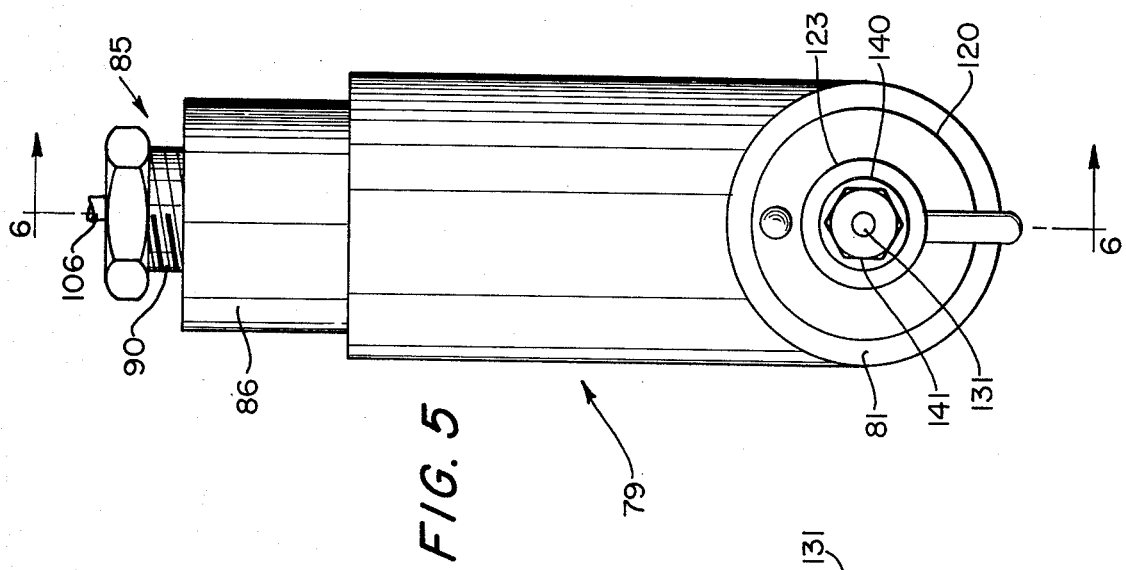
FIG. 5 is a side elevational view of the moisture sensitive hydroelectrical switch.
Figure 6:
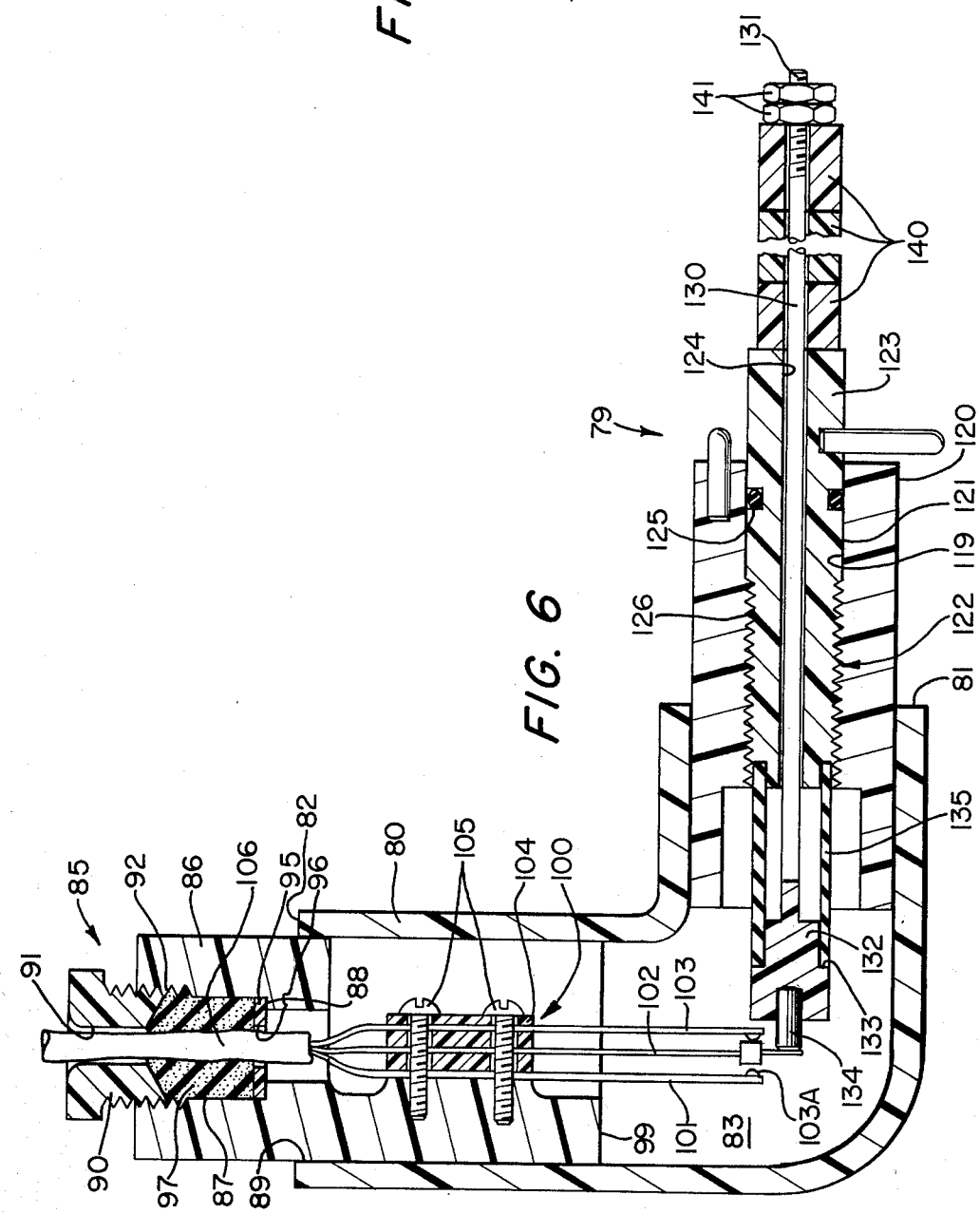
FIG. 6 is a medial sectional view taken on lie 6—6 of FIG. 5.

Reference is now made to FIGS. 5 and 6 wherein is shown the moisture sensitive hydroelectrical switch 79 comprising a hollow body 80 bent 90° to provide an inlet end 81, and outlet end 82 and a dry chamber 83. A fluid tight pressure gland, generally indicated by reference numeral 85, comprises a plastic bushing 86 having a hollow core 87 provided with a shoulder 88. Plastic bushing 86 is bonded at 89 to body 80 in outlet end 82. A metal collar 90 having a medial opening 91 is provided with screw threads 92 and is rotatively mounted in plastic bushing 86. A metal ring 95 provided with a hollow center 96 abuts shoulder 88. Compressible water proof packing 97 is interposed between metal collar 90 and metal ring 95 to be compressible therebetween.

Plastic bushing 86 is provided with a switch mounting 99. An electrical switch, generally indicated by reference numeral 100, comprises three switch levers 101, 102, 103 insulated from each other by means of insulation 104 and fastened to switch mounting 97 by means of screws 105. A three phase cable 106 or electrical conduit passes through opening 91, compressible waterproof packing 97 and hollow center 96 to be attached to the three switch levers 101, 102, 103, respectively.

A plastic body extension 120 provided with a hollow core having a sliding surface 121 and a threaded area 122 is bonded to hollow body 80 at the inlet end 81 to provide a waterproof connection. An adjustable sleeve 123 provided with an axial passageway 124, a fluid seal or O-ring 125 and threads 126 is rotatively mounted in said hollow core with O-ring 125 engaging sliding surface 121 and threads 126 engaging threaded area 122. An elongated rod 130 is provided with screw threads 131 on one end and an enlarged head 132 having a shoulder 133 on the opposite end. Said head 132 is fabricated from waterproof electrical insulation. A peg 134 fabricated from electrical insulation is fastened to enlarged head 132. A hollow sleeve 135 fabricated from polyurethane or other resilient material is interposed between the shoulder 133 on head 132 and adjustable sleeve 123 to act as a spring; as will presently appear. A plurality of collars 140 are mounted upon elongated rod 130 and are fastened thereon by means of nuts 141 which force the collars 140 against the top of adjustable sleeve 123. Collars 140 are fabricated from moisture sensitive material. Empirical experience has shown that such material expands in collar form at a rate of 1/16 of an inch for each 3 inches of length and ½ inch in diameter when wet. The material contracts 1/16 of an inch when dry.

Moisture sensitive hydroelectric switch 79 is placed in earth at a preselected depth. As the earth dries out, so will collars 140, thereby causing collars 140 to contract.

In operation, FIG. 6 shows the moisture sensitive collars 140 in wet condition with the switch 100 in closed position. When the collars become dry and contract, the polyurethane spring 135 pushes peg 134 against switch lever 102 so as to contact the mode 103A on switch lever 103 to open the electrical switch.

Figure 7:
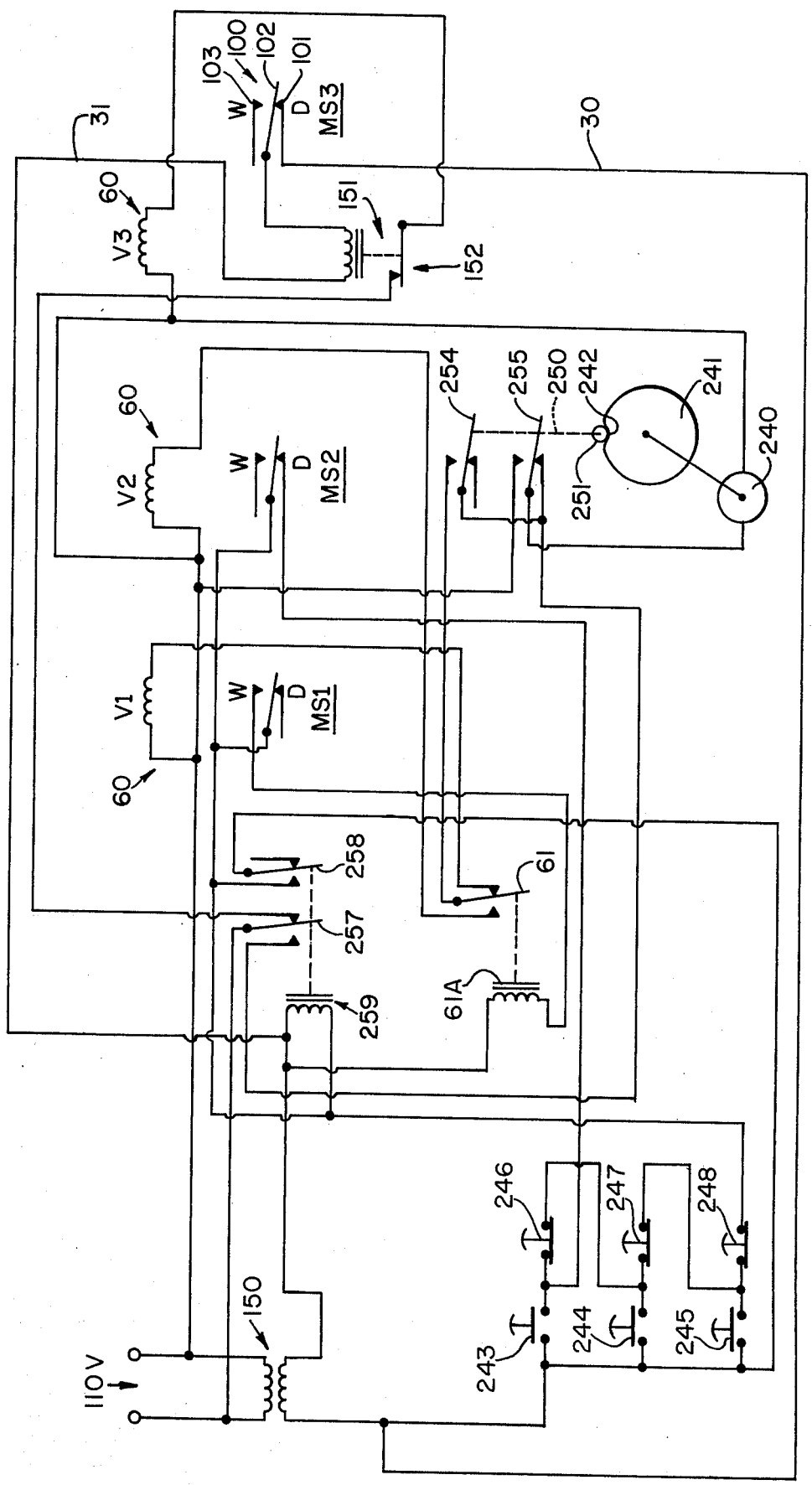
FIG. 7 is wiring diagram showing the electrical circuit.

Reference is now made to FIG. 7 wherein is shown a wiring diagram encompassing electrical switch 100, a transformer 150, a solenoid 60, a relay 151 and valve 3. Conduit 30 connects contact 101 on one side of switch 100 to transformer 150, the primary source of electrical energy. Conduit 31 connects relay coil 151 to the other side of transformer 150.

When the moisture sensitive collars 140 become dry and spring 135 moves lever 102 from closed contact 103 to open switch contact 101, relay 151 is energized, through contacts 152 thereby energizing solenoid 60 and actuating armature plunger 54 to open valve port 46 to cause water to flow from inlet 11 to outlet 12 as previously described.

FIG. 7 further illustrates a system having a plurality of moisture sensitive switches. Two additional moisture switches are indicated at MS1 and MS2 in addition to previously described MS3, generally indicated by reference numeral 100. Two additional fluid pressure valves V1 and V2 are provided in addition to V3. Each valve V1 and V2 has a solenoid 60 as described in structure and function for valve V3.

A timing motor 240 is provided with a timing disc 241 having a dwell 242.

A plurality of manually operated start buttons 243, 244, 245 and stop buttons 246, 247, 248 are located in different locations. These start and stop buttons are individual electric switches, any one of which may control the automatic electrical system.

Let it be assumed that start button 243, 244 or 245 is depressed closing the switch. If MS2 moisture switch is in wet position, nothing happens because the moisture switch MS2 remains in open position.

If moisture switch MS2 is in dry position and therefore closed, manually depressing start button 243, 244 or 245 will energize relay 259 which closes switches 257 and 258 which will start motor 40 and rotate timing disc 241. A cam arm 250 connected to switches 254 and 255 is provided with a follower 251 which rides the periphery of timing disc 241. When the follower 251 rises out of dwell 242 switches 254, 255 are closed by means of cam arm 250. Switch 255 will maintain motor 240 in energized or operating condition. The closing of switch 254 energizes solenoid 60 of fluid pressure valve V2 through switch 61 to provide a flow of water through fluid pressure valve V1.

With valve port 46 open, said valve designated as V1 in the diagram, FIG. 7, the flow of water from outlet 12 to a sprinkler head (not shown) is moistening the soil and therefore moisture sensitive switch 79 (MS1). When MS1 closes, it energizes the coil 61A which operates switch 61 to energize solenoid 60 of valve V2 thereby providing water to MS2. When MS2 operates, it closes down the system.

Switches 246, 247, 248 are normally closed. If it is desired to shut down the system before the MS switches function, depression of switches 246, 247, 248 will terminate the watering cycle. The motor will always operate until dwell 242 accommodates follower 251.

Having shown and described a preferred embodiment of the present invention by way of example, it should be realized that structural changes could be made and other examples given without departing from either the spirit or scope of this invention.

What I claim is:

1. A moisture sensitive hydroelectrical switch comprising a hollow body having an inlet end, an outlet end, and a dry chamber, an electrical switch, having electrical conduits provided with switch contacts, fastened in said dry chamber, a fluid tight pressure gland, having a medial passageway, rotatively connected to said hollow body at said outlet end with said electrical conduits passing through said medial passageway, a body extension having a hollow core fastened to the inlet end of said hollow body, an adjustable sleeve, provided with an axial passageway, rotatively connected to said body extension, a rod having a head, fabricated from waterproof electrical insulation, slidably mounted in said axial passageway, a peg, fabricated from electrical insulated material, fastened in said head, a hollow sleeve, fabricated from resilient material, interposed between said adjustable sleeve and said head to urge said peg against said switch contacts, a plurality of collars, fabricated from moisture sensitive material, which expands when wet and contracts when drying, fastened to said rod to move said peg toward and away from said switch contacts to open and close said electrical switch.

2. An automatic watering device comprising a fluid pressure valve having a hollow body provided with an outlet, an inlet having a shelf provided with a valve bore and a valve seat, a boss having a cavity and a first conduit having a selected diametrical area, a second conduit having a selected diametrical area greater than said first diametrical area, and a duct between said cavity and said outlet, an inlet valve comprising a valve body having a valve head having a preselected area, a valve stem having an arcuate fluid pressure surface provided with a preselected area smaller than said first mentioned preselected area, said valve stem slidably mounted in said valve bore, a fluid sealing membrane fastened to said valve head and to said hollow body to fluid seal one end of said inlet and to accommodate reciprocal movement of said inlet valve, a cap having a chamber, means fastening said cap to said hollow body with said chamber aligned with said valve head, a diaphragm provided with a plunger valve port, a first port and second port, means fastening said diaphragm in said cavity with said plunger valve port between said cavity and said duct, said first conduit connecting said inlet with said cavity through said first port, said second conduit connecting said chamber with said cavity through said second port, a hollow cap having a flanged end abutting the edge of said diaphragm, means fastening said flanged end within said cavity, a solenoid surrounding and fastened to said hollow cap, a plunger having a valve end slidably mounted within said hollow cap, resilient means within said hollow cap abutting said plunger to urge said valve end into said plunger valve port whereby energization of said solenoid moves said valve end away from said valve port, against the resilient means to permit fluid to flow from said chamber to and through said duct, and inlet fluid to flow through said first conduit to and through said duct, whereby said inlet valve moves away from said valve seat to permit fluid to flow through said valve bore to said outlet, a moisture sensitive hydroelectrical switch comprising a hollow body having an inlet end, an outlet end, and a dry chamber, an electrical switch, having electrical conduits provided with switch contacts, fastened in said dry chamber, a fluid tight pressure gland, having a medial passageway, rotatively connected to said hollow body at said outlet end with said electrical conduits passing through said medial passageway, a body extension having a hollow core fastened to the inlet end of said hollow body, an adjustable sleeve, provided with an axial passageway, rotatively connected to said body extension, a rod having a head, fabricated from waterproof electrical insulation, slidably mounted in said axial passageway, a peg, fabricated from electrical insulated material, fastened in said head, a hollow sleeve, fabricated from resilient material, interposed between said adjustable sleeve and said head to urge said peg against said switch contacts, a plurality of collars, fabricated from moisture sensitive material, which expands when wet and contracts when drying, fastened to said rod to move said peg toward and away from said switch contacts to open and close said electrical switch, and means connecting said electrical conduits to said solenoid.

3. An automatic watering device as defined in claim 2, an electrical circuit having a transformer to a source of power, one of said electrical conduits in said electrical circuit connecting said transformer to a contact on said electrical switch, a second of said electrical conduits having said solenoid and a relay connected to another of said switch contacts and to said transformer, whereby said peg, actuated by said moisture operated switch, shifts said switch contacts and therefore said switch from closed to open position to energize said relay and thereby said solenoid whereby said armature plunger is actuated to open valve position to allow water to flow from inlet 11 to outlet 12.

4. An automatic watering device as defined in claim 3, said electrical circuit having a plurality of moisture operated switches, and a plurality of fluid pressure valves, one for each moisture operated switch, a plurality of solenoids, one for each fluid pressure valve, a timing motor having a timing disc with a dwell, a plurality of manually operated start buttons, a plurality of manually operated stop buttons, each start and stop button being an electrical switch in said electrical circuit to open or close said electrical circuit, a second relay and a third relay, a second electrical switch, a third electrical switch, a fourth electrical switch, a fifth electrical switch a cam arm having a follower connected to said fourth and fifth electrical switches, said follower engaging said timing disc and dwell, actuation of one of said plurality of start buttons closes the electrical circuit to a moisture operated switch, if said last mentioned switch is in wet position, it will be in open position and the solenoid will not operate to lift said armature plunger out of the plunger valve port, if said last mentioned switch is in dry position, said start button will close the electrical circuit to said first relay and to said second and third switches and to said motor to rotate said motor and timing disc to close said fourth and fifth switches to energize first solenoid and thereby lift said armature plunger out of the plunger valve port to open the valve for water to flow to said moisture operated switch, whereby said switch is actuated to open position and thereby open the electrical circuit.

* * * * *